(12) United States Patent
Goldsmith

(10) Patent No.: US 9,954,257 B2
(45) Date of Patent: Apr. 24, 2018

(54) FLUORESCENT INDICATOR OF LITHIUM IONS AND RELATED METHODS

(71) Applicant: Wisconsin Alumni Research Foundation, Madison, WI (US)

(72) Inventor: Randall Howard Goldsmith, Madison, WI (US)

(*) Notice: Subject to any disclaimer, the term of this patent is extended or adjusted under 35 U.S.C. 154(b) by 239 days.

(21) Appl. No.: 15/070,269

(22) Filed: Mar. 15, 2016

(65) Prior Publication Data
US 2016/0276717 A1    Sep. 22, 2016

Related U.S. Application Data

(60) Provisional application No. 62/133,612, filed on Mar. 16, 2015.

(51) Int. Cl.

| | |
|---|---|
| *H01M 10/48* | (2006.01) |
| *H01M 10/0525* | (2010.01) |
| *H01M 10/0565* | (2010.01) |
| *H01M 2/16* | (2006.01) |
| *H01M 4/62* | (2006.01) |

(52) U.S. Cl.
CPC ....... *H01M 10/488* (2013.01); *H01M 2/1653* (2013.01); *H01M 4/62* (2013.01); *H01M 10/0525* (2013.01); *H01M 10/0565* (2013.01); *H01M 2300/0082* (2013.01)

(58) Field of Classification Search
CPC .......... H01M 10/488; H01M 10/0525; H01M 10/0565; H01M 4/62; H01M 2/1653; H01M 2300/0082
See application file for complete search history.

(56) References Cited

U.S. PATENT DOCUMENTS 4,670,218 A * 6/1987 Gantzer ................. G01N 33/84
                                                            422/420
4,968,630 A * 11/1990 Charlton ................ G01N 33/84
                                                            422/420

OTHER PUBLICATIONS

Obare, Sherine O., and Murphy, Catherine J., A Two-Color Fluorescent Lithium Ion Sensor, Inorg. Chem. 2001, 40, Oct. 10, 2001, pp. 6080-6082.
Obare, Sherine O. and Murphy, Catherine J., Selective blue emission from an HPBO-Li+ complex in alkaline media, New J. Chem., 2001, 25, Dec. 7, 2001, pp. 1600-1604.
Qin, Wei, et al., Specific fluorescence determination of lithium ion based on 2-(2-hydroxyphenyl)benzoxazole, Analyst, 2001, 126, Aug. 20, 2001, pp. 1499-1501.
Kim, Y., et al., Blue Light-Emitting Device Based on a Unidentate Organometallic Complex Containing Lithium as an Emission Layer, Adv. Mater. 1999, 11, No. 17, Nov. 26, 1999, pp. 1463-1466.
Rea, M., et al., Lighting Up Lithium, Research Experience for Undergraduates Program, Poster Presentation, Aug. 1, 2014, pp. 1.
Rochat, S., et al., Ruthenium-based metallacrown complexes for the selective detection of lithium ions in water and in serum by fluorescence spectroscopy, Org. Biomol. Chem., 2009, 7, Jan. 27, 2009, pp. 1147-1153.
Grabchev, I., et al., A polyamidoamine dendrimer as a selective colorimetric and ratiometric fluorescent sensor for Li+ cations in alkali media, Dyes and Pigments 82 (2009), Feb. 20, 2009, pp. 336-340.
Qin, W., et al., A Fiber-Optic Fluorescence Sensor for Lithium Ion in Acetonitrile, Anal. Chem. 2002, 74, Sep. 15, 2002, pp. 4757-4762.

* cited by examiner

*Primary Examiner* — Muhammad S Siddiquee
(74) *Attorney, Agent, or Firm* — Bell & Manning, LLC

(57) ABSTRACT

A lithium ion indicator material for a lithium ion battery is provided, the material comprising a lithium ion battery material and Li$^+$ profluorophore dispersed within or on the lithium ion battery material, wherein the Li$^+$ profluorophore comprises a 2-(naphtho[2,3-d]oxazol-2-yl)phenolate moiety or a derivative thereof, or a 2-(naphtho[2,3-d]oxazol-2-yl) phenol moiety or a derivative thereof. Lithium ion batteries comprising the lithium ion indicator material are also provided.

19 Claims, 10 Drawing Sheets

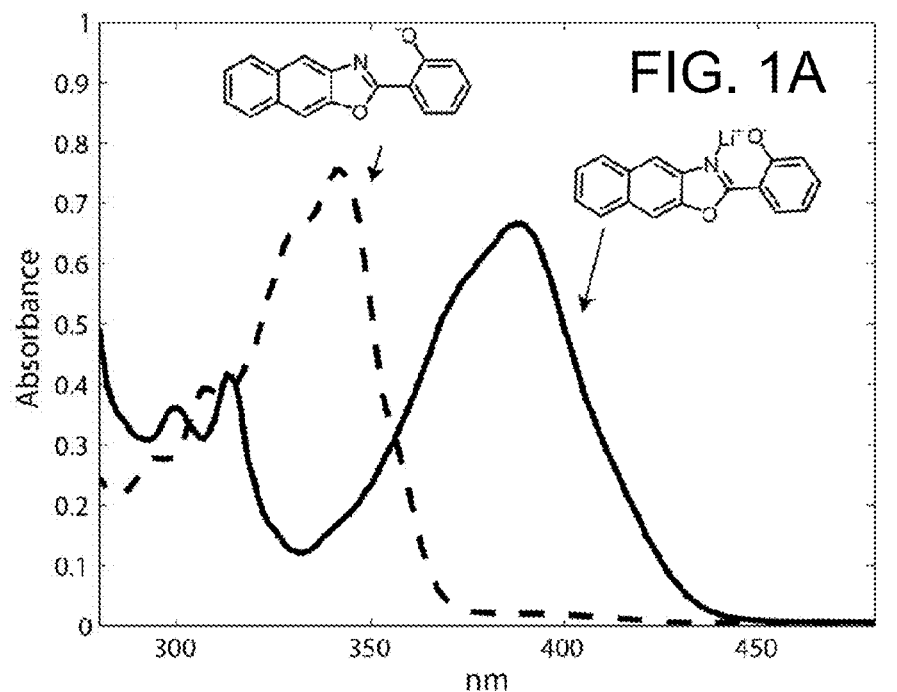
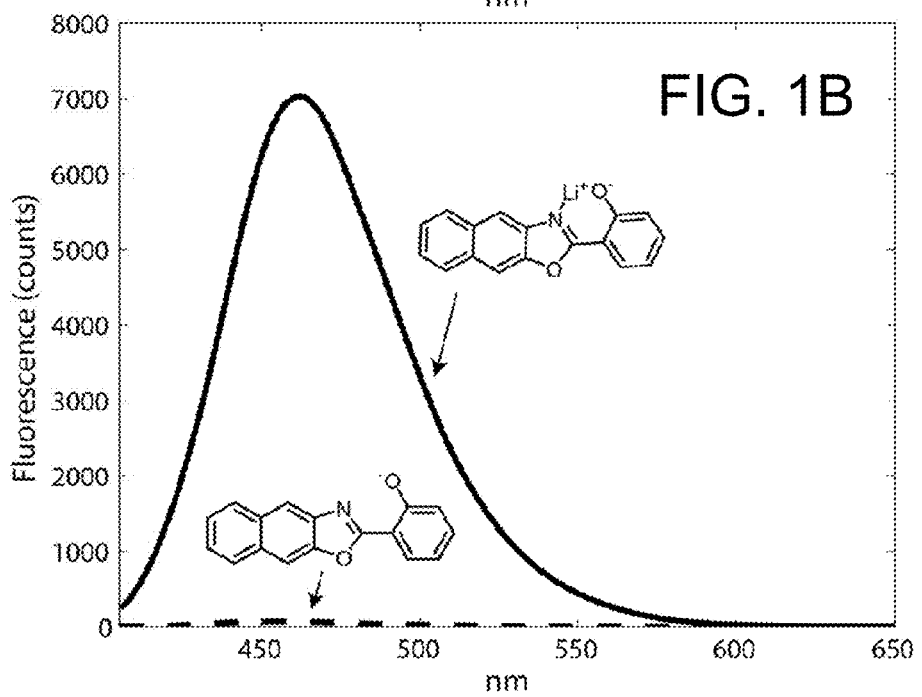

FLUORESCENT INDICATOR OF LITHIUM IONS AND RELATED METHODS

CROSS-REFERENCE TO RELATED APPLICATIONS

The present application claims priority to U.S. Provisional Patent Application No. 62/133,612 that was filed Mar. 16, 2015, the entire content of which is hereby incorporated by reference.

BACKGROUND

Batteries can provide robust and dependable power storage, can be reusable, and can act as a multiplier of effectiveness for intermittent sources of in situ power generation, such as solar or wind power. Lithium-ion batteries have emerged as a leading technology due to their high energy density and low rates of self-discharge. However, the demand for batteries to possess increasingly higher power densities, fast charging times, lighter weights, and safer operation, puts a tremendous strain on the active materials that comprise the battery. This strain, often originating from the high electrical and chemical potentials that are maintained inside the device, can result in a number of different failure modes. Battery ageing can result in a slow decrease of battery performance, frequently manifested as capacity fade and increase of self-discharge rates. In other cases, battery failure can be much more acute and violent, and constitutes a significant fire and safety hazard. These catastrophic failures can result from some physical trauma inflicted upon the battery, or can happen as a result of typical use and may present little or no warning signs before failure.

New generations of lithium-ion batteries that can offer increased capacity and other performance metrics without compromising safety or reliability are required. Research into the mechanism of typical battery usage and how those mechanisms evolve in time may lead to those new generations. Methods which have been used to characterize the physical and chemical properties of lithium ion batteries and subsystems include electrochemical impedance spectroscopy (EIS); scanning probe microscopy (SPM); X-ray absorption spectroscopies such as X-ray absorption near-edge structure (XANES), X-ray absorption fine-structure (EXAFS) and X-ray tomography; electron microscopies and spectroscopies such as scanning electron microscopy (SEM), transmission electron microscopy (TEM) and electron energy loss spectroscopy (EELS); and nuclear magnetic resonance (NMR).

SUMMARY

Lithium ion ($Li^+$) profluorophores and $Li^+$ batteries and $Li^+$ battery components comprising the $Li^+$ profluorophores are provided. Related methods are also provided, including methods of imaging lithium ions in $Li^+$ batteries and $Li^+$ battery components using the $Li^+$ profluorophores and fluorescence microscopy.

In one aspect, a lithium ion indicator material for a lithium ion battery is provided, the material comprising a lithium ion battery material and $Li^+$ profluorophore dispersed within or on the lithium ion battery material, wherein the $Li^+$ profluorophore comprises a 2-(naphtho[2,3-d]oxazol-2-yl)phenolate moiety or a derivative thereof, or a 2-(naphtho[2,3-d]oxazol-2-yl)phenol moiety or a derivative thereof.

In another aspect, a lithium ion battery is provided comprising an anode electrode; a cathode electrode; an electrolyte composition between the anode and the cathode; and optionally, a separator between the anode electrode and the cathode electrode, the electrolyte composition diffused throughout the separator. The anode electrode, the cathode electrode, the electrolyte composition, the separator, or combinations thereof comprise a $Li^+$ profluorophore dispersed within or thereon, wherein the $Li^+$ profluorophore comprises a 2-(naphtho[2,3-d]oxazol-2-yl)phenolate moiety or a derivative thereof, or a 2-(naphtho[2,3-d]oxazol-2-yl) phenol moiety or a derivative thereof.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 1A shows the electronic absorption spectrum of a $Li^+$ profluorophore, 2-(naphtho[2,3-d]oxazol-2-yl)phenolate, in the lithium ion unbound state of the molecule and the lithium ion bound state of the molecule according to an illustrative embodiment. FIG. 1B shows the fluorescence spectrum of the $Li^+$ profluorophore in the lithium ion unbound state of the molecule and the lithium ion bound state of the molecule.

In FIG. 5A, lithium ions are injected into the electrolyte composition. In FIG. 5B, lithium ions begin to diffuse into the electrolyte composition. In FIG. 5C, the lithium ions have diffused throughout the electrolyte composition.

In FIG. 6A, lithium ions are injected into the separator. In FIG. 6B, the lithium ions have diffused into most, but not all, spatial regions of the separator.

In FIG. 7A, the lithium ion battery is shown at an initial time point. In FIG. 7B, the solid electrolyte interface/interphase (SEI) layer is forming at the interface between the electrolyte composition and the electrodes, leading to a decrease in fluorescence. In FIG. 7C, the SEI layer is increasing, further decreasing fluorescence.

In FIG. 10A, compound 20 was reacted with a graphitic electrode which had been pretreated with diazonium-functionalized phenyl azide. In FIG. 10B, compound 24 was reacted with an electrode composed of $LiCoO_2$ or $LiNi_xMn_yCo_zO_2$ (NMC).

DETAILED DESCRIPTION

Figure 2:
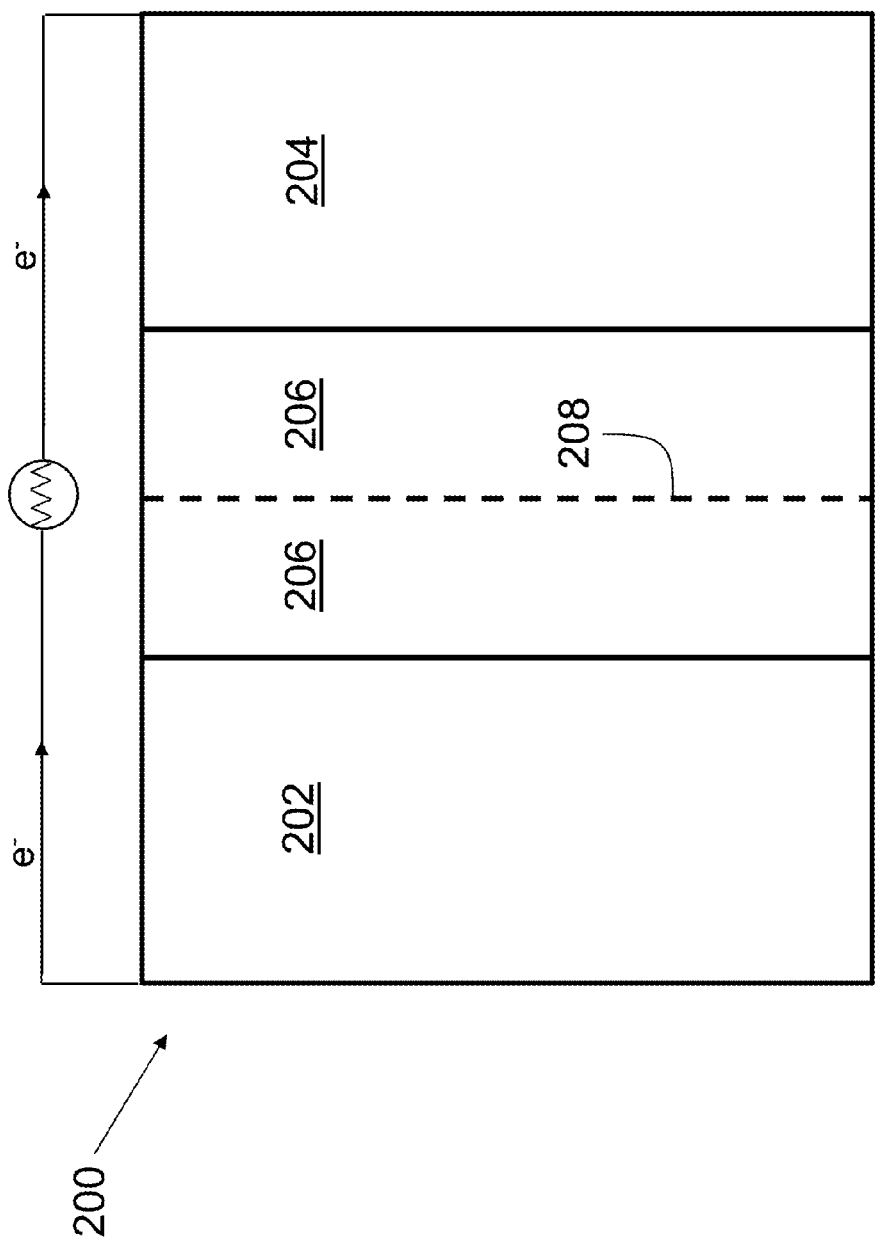
FIG. 2 depicts a $Li^+$ battery according to an illustrative embodiment.

Lithium ion ($Li^+$) profluorophores and $Li^+$ batteries and $Li^+$ battery components comprising the $Li^+$ profluorophores are provided. Related methods are also provided, including methods of imaging lithium ions in $Li^+$ batteries and $Li^+$ battery components using the $Li^+$ profluorophores and fluorescence microscopy.

Lithium Ion ($Li^+$) Profluorophores

By the term "profluorophore," it is meant a molecule that becomes fluorescent in the presence of a chemical agent. The disclosed $Li^+$ profluorophores are molecules which are capable of binding to lithium ions to form a coordination complex. In addition, $Li^+$ profluorophores are molecules which exhibit a substantial increase in fluorescence upon lithium ion binding (i.e., the lithium ion is the chemical agent) as compared to the lithium ion unbound form of the molecule. The term "$Li^+$ profluorophore" as used herein encompasses both the molecule in its bound state (i.e., bound to a lithium ion) and its unbound state.

Suitable $Li^+$ profluorophores may include those exhibiting one or more of the following characteristics: a high ratio of the fluorescence yield when bound to lithium ions as compared to the fluorescence yield when not bound to lithium ions; a high association constant for lithium ions; high selectivity for lithium ions over other ions, e.g., sodium ions, potassium ions, calcium ions, magnesium ions, etc.; and high photostability. These characteristics are advantageous for imaging very small amounts of lithium ions in complex environments (such as $Li^+$ batteries and $Li^+$ battery components under working conditions) over long periods of time.

Suitable $Li^+$ profluorophores may include those which exhibit an electronic absorption maximum (for the lithium ion unbound form of the molecule) over a range of wavelengths in the visible region of the electromagnetic spectrum (e.g., from about 400 nm to about 700 nm.) Similarly, suitable $Li^+$ profluorophores may include those which exhibit a fluorescence maximum (for the lithium ion bound form of the molecule) over a range of wavelengths in the visible region of the electromagnetic spectrum (e.g., from about 500 nm to about 800 nm). These characteristics are advantageous for minimizing photobleaching of the $Li^+$ profluorophores, improving signal to background and minimizing damage to the materials (e.g., $Li^+$ batteries or $Li^+$ battery components) in which the $Li^+$ profluorophores may be incorporated.

An illustrative $Li^+$ profluorophore is 2-(naphtho[2,3-d]oxazol-2-yl)phenolate, a salt of the molecule, or the protonated version of the molecule (2-(naphtho[2,3-d]oxazol-2-yl)phenol). Thus, the term "Li+ profluorophore" also encompasses protonated versions, unprotonated versions and salts. Illustrative $Li^+$ profluorophores also include derivatives of any of these compounds. Derivatives of these compounds are molecules in which the 2-(naphtho[2,3-d]oxazol-2-yl)phenol/phenolate backbone has been chemically modified, as further described below.

By way of illustration, derivatives may include molecules in which the oxazole moiety has been converted into a thiazole moiety. Derivatives may include molecules which have been chemically modified to include one or more substituent groups. Such substituent groups may be situated in various positions on the molecule. By way of illustration, substituent groups may be situated on one or more of the benzene rings in the molecule such that one or more bonds to hydrogen on one or more of the benzene rings are replaced by a bond to the respective substituent group. Other derivatives may be used.

A variety of substituent groups may be used. Conjugation extending groups may be used. Such groups may be advantageous for tuning the optical properties of the $Li^+$ profluorophore, e.g., red-shifting the electronic absorption/fluorescence of the lithium ion unbound/bound state of the molecule. Illustrative conjugation extending groups may include an alkenyl group, an alkynyl group, and an aryl group. Different conjugation extending groups may join together to form rings, including aromatic rings. By way of illustration, an alkenyl group may join with an adjacent alkenyl group to form an aromatic ring, e.g., benzene. The type of conjugation extending groups and position of such groups in the $Li^+$ profluorophore may be selected to achieve a particular optical property, e.g., a particular wavelength for the fluorescence maximum.

Electron withdrawing groups may be used. Such groups may be advantageous for tuning the optical properties of the $Li^+$ profluorophore as described above, as well as lowering the $pK_a$ of the phenol moiety of the $Li^+$ profluorophore to facilitate deprotonation and $Li^+$ binding. Illustrative electron withdrawing groups include cyano groups (—C(N)); nitro groups (—$NO_2$); ketone groups (—C(O)R, wherein R is a carbon-containing group); ester groups (—C(O)OR, wherein R is a carbon-containing group, e.g., an alkyl or an aryl group); aldehyde groups (—C(O)H); a halogen atom; and an alkyl group. The type of electron withdrawing groups and position of such groups in the $Li^+$ profluorophore may be selected to achieve a particular optical property and/or phenol moiety $pK_a$.

Electron donating groups may be used. Such groups may be advantageous for tuning the optical properties of the $Li^+$ profluorophore as described above. Illustrative electron donating groups include amine groups (—$NR_1R_2$, wherein $R_1$ and $R_2$ are independently selected from hydrogen and a carbon-containing group, e.g., an alkyl or an aryl group); ether groups (—OR, wherein R is a carbon-containing group, e.g., an alkyl or an aryl group); and thioether groups (—SR, wherein R is a carbon-containing group, e.g., an alkyl or an aryl group).

Linking group precursors may be used as substituent groups. Linking group precursors are capable of forming covalent bonds to another material (i.e., functional groups on such materials) such as components of $Li^+$ batteries in order to link the $Li^+$ profluorophore to such materials. Thus, a linking group precursor may react with a functional group on such materials to provide a linking group, i.e., the chemical entity which covalently links the $Li^+$ profluorophore to the material. In other words, the linking group precursor of the $Li^+$ profluorophore is converted to a linking group once covalently bound to the material.

Illustrative linking group precursors include alkynyl groups (alkynyl groups are capable of binding to azide functional groups); azide groups (—$N_3^-$) (azide groups are capable of binding to alkyne functional groups); phosphonate groups (—$PO(OR_1)(OR_2)$, wherein $R_1$ and $R_2$ are independently selected from hydrogen and a carbon-containing group, e.g., alkyl groups and aryl groups) (phosphonate groups are capable of binding to metal oxide functional groups); and silane groups (—$SiR_1R_2R_3$ wherein at least one of $R_1$, $R_2$, and $R_3$ is an alkoxy group and the remaining groups are independently selected from hydrogen, hydroxyl groups and alkoxy groups) (silane groups are capable of binding to metal oxide functional groups). The type of linking group precursors and position of such precursors in the Li+ profluorophore may be selected depending upon the type of material to be functionalized by the Li+ profluorophore. It is to be understood that linking group precursors may further include spacer moieties (e.g., —(CH$_2$)$_n$—, wherein n is 1 or greater, e.g., 2, 4, 6, 8, 10, etc.) covalently bound to these functional groups (e.g., alkynyl groups, azide groups, phosphonate groups, silane groups). By way of illustration, a hydroxyphenyl alkyl (e.g., (4-hydroxyphenyl) ethyl) or an alkyl phosphonate (e.g., —(CH$_2$)$_2$PO(OCH$_3$)$_2$) may be used as linking group precursors.

In the substituent groups above, "—" denotes the covalent linkage to the Li+ profluorophore.

In the groups above, the following definitions may be used. An alkyl group may be a linear, branched or cyclic alkyl group in which the number of carbons may range from, e.g., 2 to 24, 2 to 12, 2 to 6, 1 to 3, etc. The alkyl group may be unsubstituted, by which it is meant the alkyl group contains no heteroatoms. The alkyl group may be substituted, by which it is meant an unsubstituted alkyl group in which one or more bonds to a carbon(s) or hydrogen(s) are replaced by a bond to non-hydrogen and non-carbon atoms. Non-hydrogen and non-carbon atoms include, e.g., a halogen atom such as F, Cl, Br, and I; an oxygen atom, including an oxygen atom in groups such as hydroxyl, alkoxy, aryloxy, carbonyl, carboxyl, and ester groups; a nitrogen atom, including a nitrogen atom in groups such as amines, amides, alkylamines, arylamines, and alkylarylamines, and nitriles; and a sulfur atom.

An alkenyl group may be a mono- or polyunsaturated, linear, branched or cyclic alkenyl group in which the number of carbons may range from, e.g., 2 to 24, 2 to 12, 2 to 6, 2 to 4, etc. The alkenyl group may be unsubstituted or substituted as described above with respect to alkyl groups.

An alkynyl group may be a mono- or polyunsaturated, linear, branched or cyclic alkynyl group in which the number of carbons may range from, e.g., 2 to 24, 2 to 12, 2 to 6, 2 to 4, etc. The alkynyl group may be unsubstituted or substituted as described above with respect to alkyl groups.

An aryl group may be monocyclic having one aromatic ring or polycyclic having fused aromatic rings (e.g., two, three, etc. rings). Monocyclic and polycyclic aryl groups may be unsubstituted or substituted. Substituted monocyclic and polycyclic aryl groups are groups in which one or more bonds to a carbon(s) or hydrogen(s) are replaced by a bond to non-hydrogen and non-carbon atoms. Illustrative non-hydrogen and non-carbon atoms have been described above. Thus, substituted monocylic and substituted polycyclic aryl groups encompass heteroaryl groups.

An illustrative Li+ profluorophore has Formula 1,

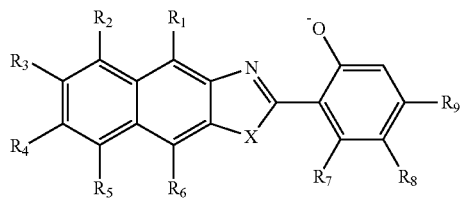

Formula 1 wherein X is O or S and R$_{1-9}$ are independently selected from hydrogen and any of the conjugation extending groups, electron withdrawing groups, electron donating groups, and linking group precursors described above. Illustrative Li+ profluorophores also include the protonated version of a molecule having Formula 1 and a salt of a molecule having Formula 1.

In some embodiments, the Li+ profluorophore has Formula 1, wherein X is O or S; and either one substituent group from R$_{1-9}$ is selected from any of the conjugation extending groups, electron withdrawing groups, electron donating groups and linking group precursors described above and the remaining substituent groups are hydrogen; or two adjacent substituent groups from R$_{1-9}$ join to form an aromatic ring and the remaining substituent groups are hydrogen. Protonated versions and salt forms of such molecules are also encompassed.

In some embodiments, the Li+ profluorophore has Formula 1, wherein X is O or S; and either one substituent group from R$_1$, R$_2$, R$_7$ and R$_8$ is selected from any of the disclosed electron withdrawing groups and the remaining substituent groups are hydrogen; or one substituent group from R$_{3-9}$ is selected from any of the disclosed conjugation extending groups and the remaining substituent groups are hydrogen; or one substituent group from R$_1$ and R$_2$ is selected from any of the disclosed electron donating groups and the remaining substituent groups are hydrogen; or R$_8$ is any of the disclosed linking group precursors and the remaining substituent groups are hydrogen; or two adjacent substituent groups from R$_3$, R$_4$, R$_7$, R$_8$ and R$_9$ join to form an aromatic ring and the remaining substituent groups are hydrogen. Protonated versions and salt forms of such molecules are also encompassed.

In some embodiments, the Li+ profluorophore has Formula 1, wherein X is O or S; and either one substituent group from R$_{1-9}$ is selected from a halogen atom (e.g., F), an unsubstituted or substituted alkyl group (e.g., —CH$_3$ or —CF$_3$), a cyano group, an alkynyl group (e.g., ethynyl or propynyl), an ether group (e.g., —OCH$_3$) and a linking group precursor and the remaining substituent groups are hydrogen; or two adjacent substituent groups from R$_{1-9}$ join to form an aromatic ring (e.g., benzene) and the remaining substituent groups are hydrogen. Protonated versions and salt forms of such molecules are also encompassed.

In some embodiments, the Li+ profluorophore has Formula 1, wherein X is O or S; and either one substituent group from R$_1$, R$_2$, R$_7$ and R$_8$ is selected from a halogen atom (e.g., F), an unsubstituted or substituted alkyl group (e.g., —CH$_3$ or —CF$_3$) and a cyano group and the remaining substituent groups are hydrogen; or one substituent group from R$_{3-9}$ is an alkynyl group (e.g., ethynyl or propynyl) and the remaining substituent groups are hydrogen; or one substituent group from R$_1$ and R$_2$ is selected from an ether group (e.g., —OCH$_3$) and the remaining substituent groups are hydrogen; or R$_8$ is any of the disclosed linking group precursors and the remaining substituent groups are hydrogen; or two adjacent substituent groups from R$_3$, R$_4$, R$_7$, R$_8$ and R$_9$ join to form an aromatic ring (e.g., benzene) and the remaining substituent groups are hydrogen. Protonated versions and salt forms of such molecules are also encompassed.

Table 1 shows a number of illustrative species of Li+ profluorophores. Protonated versions and salt forms of the species are also encompassed.

TABLE 1

Illustrative species of Li⁺ profluorophores.

| | CHEMICAL STRUCTURE | CHEMICAL NAME |
|---|---|---|
| Compound 3 | | 2-(naphtho[2,3-d]oxazol-2-yl)phenolate |
| Compound 4 | | 2-(naphtho[2,3-d]thiazol-2-yl)phenolate |
| Compound 5 | | 3-(naphtho[2,3-d]oxazol-2-yl)naphthalen-2-olate |
| Compound 6 | | 3-(naphtho[2,3-d]thiazol-2-yl)naphthalen-2-olate |
| Compound 7 | | 1-(naphtho[2,3-d]oxazol-2-yl)naphthalen-2-olate |
| Compound 8 | | 2-(anthra[2,3-d]oxazol-2-yl)phenolate |
| Compound 9 | | 4-cyano-2-(naphtho[2,3-d]oxazol-2-yl)phenolate |
| Compound 10 | | 4-cyano-2-(naphtho[2,3-d]oxazol-2-yl)phenolate |

TABLE 1-continued

Illustrative species of Li⁺ profluorophores.

| | CHEMICAL STRUCTURE | CHEMICAL NAME |
|---|---|---|
| Compound 11 | | 2-(5-methoxynaphtho[2,3-d]oxazol-2-yl)phenolate |
| Compound 12 | | 4-fluoro-2-(naphtho[2,3-d]oxazol-2-yl)phenolate |
| Compound 13 | | 2-(naphtho[2,3-d]oxazol-2-yl)-4-(trifluoromethyl)phenolate |
| Compound 14 | | 2-(4-cyanonaphtho[2,3-d]oxazol-2-yl)phenolate |
| Compound 15 | | 2-(4-methoxynaphtho[2,3-d]oxazol-2-yl)phenolate |
| Compound 16 | | 4-ethynyl-2-(naphtho[2,3-d]oxazol-2-yl)phenolate |
| Compound 17 | | 2-(9-ethynylnaphtho[2,3-d]oxazol-2-yl)phenolate |
| Compound 18 | | 2-(8-ethynylnaphtho[2,3-d]oxazol-2-yl)phenolate |

TABLE 1-continued

Illustrative species of Li⁺ profluorophores.

| | CHEMICAL STRUCTURE | CHEMICAL NAME |
|---|---|---|
| Compound 19 | | 2-(6-ethynylnaphtho[2,3-d]oxazol-2-yl)phenolate |
| Compound 20 | | 2-(naphtho[2,3-d]oxazol-2-yl)-4-(prop-2-yn-1-yl)phenolate |
| Compound 21 | | 3-methyl-2-(naphtho[2,3-d]oxazol-2-yl)phenolate |
| Compound 23 | | 4-ethylphosphonic dimethyl ester-2-(naphtho[2,3-d]oxazol-2-yl)phenolate |
| Compound 24 | | 4-(4-hydroxyphenyl)ethyl-2-(naphtho[2,3-d]oxazol-2-yl)phenol |

Compounds which are derived from compounds 16 and 20 in which a spacer moiety (e.g., —$(CH_2)_n$—, wherein n is 1 or greater, e.g., 2, 4, 6, 8, 10, etc.) is inserted in between the substituent group and the carbon on the phenolate moiety may be used. Compounds 16 and 20 and their derivatives including a spacer moiety are particularly useful for covalent attachment to Li⁺ battery component materials.

Regarding the species shown in Table 1, methods of making compounds 3, 5, 16 and 24 are provided in the Examples below. Other species, including other species shown in Table 1, may be made using schemes similar to those provided in the Examples below.

Compound 22 having the structure below is also provided.

Compound 22

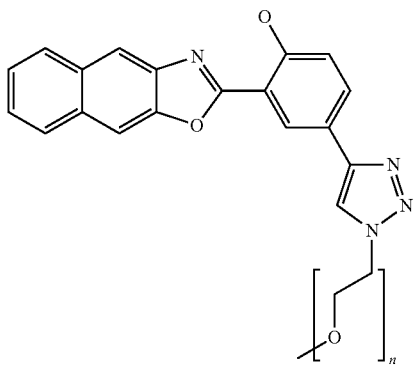

Compound 22 is a polymer (poly(ethylene oxide)) covalently bound to a Li+ profluorophore. The Li+ profluorophore comprises the 2-(naphtho[2,3-d]oxazol-2-yl)phenolate moiety and a linking group derived from a linking group precursor (a propynyl group, but an ethynyl group may be used). The number of monomer units (n) in the poly(ethylene oxide) polymer may vary, e.g., from about 100 to about 50,000. Compound 22 may be made using click chemistry, e.g., by reacting compound 16 (a derivative of 2-(naphtho[2,3-d]oxazol-2-yl)phenolate comprising a propynyl (ethynyl) group as a linking group precursor) with a poly(ethylene oxide) polymer comprising azide functional groups. A similar compound may be made by reacting compound 20 with a poly(ethylene oxide) polymer comprising azide functional groups. Derivatives of compounds 16 and 20 including spacer moieties as described above may also be reacted with a poly(ethylene oxide) polymer comprising azide functional groups.

Compound 25 having the structure below is also provided.

Li+ Batteries and Battery Components

The Li+ profluorophores may be incorporated into Li+ batteries and components of Li+ batteries. A Li+ battery may include an anode electrode, a cathode electrode and an electrolyte composition between the anode electrode and the cathode electrode. The Li+ battery may further include a separator between the anode electrode and the cathode electrode, the electrolyte composition diffused throughout the separator. In these embodiments, the anode electrode, cathode electrode, electrolyte composition and separator may be considered to be components of the Li+ batteries. The materials used for such components may be considered to be lithium ion battery materials. An illustrative Li+ battery 200 is shown in FIG. 2 which includes an anode, a cathode electrode 204, an electrolyte 206, and a separator 208.

A variety of materials for the anode electrode may be used, e.g., a carbonaceous material such as graphite. A variety of materials for the cathode electrode may be used, e.g., a lithium containing metal oxide such as $LiCoO_2$ or $LiNi_xMn_yCo_zO_2$ (NMC). Such materials may be referred to as electrode active materials, anode active materials, and cathode active materials.

A variety of electrolyte compositions may be used. The electrolyte composition may be a liquid, gel or solid electrolyte composition. If the electrolyte composition is a gel or solid, the form of the electrolyte composition may be that of a layer or film. Depending upon the type of electrolyte composition (i.e., liquid, gel, solid), the electrolyte composition may be formed from a variety of materials. The electrolyte composition may comprise a polymer suitable for use in a Li+ battery, i.e., an electrolyte polymer. Such polymers include lithium coordinating polymers, polymers which are capable of binding to lithium ions to form a coordination complex such as polyethylene oxide or polysiloxane. Illustrative suitable polymers also include polyethylene oxide (PEO) and propylene carbonate (PC). The electrolyte composition may comprise a salt, e.g., LiCl, Compound 25

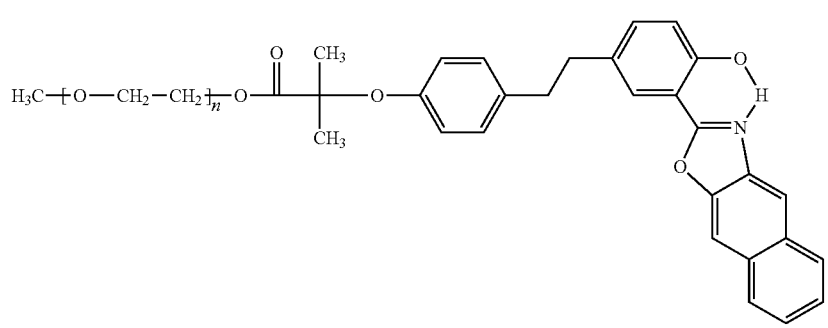

Figure 9:
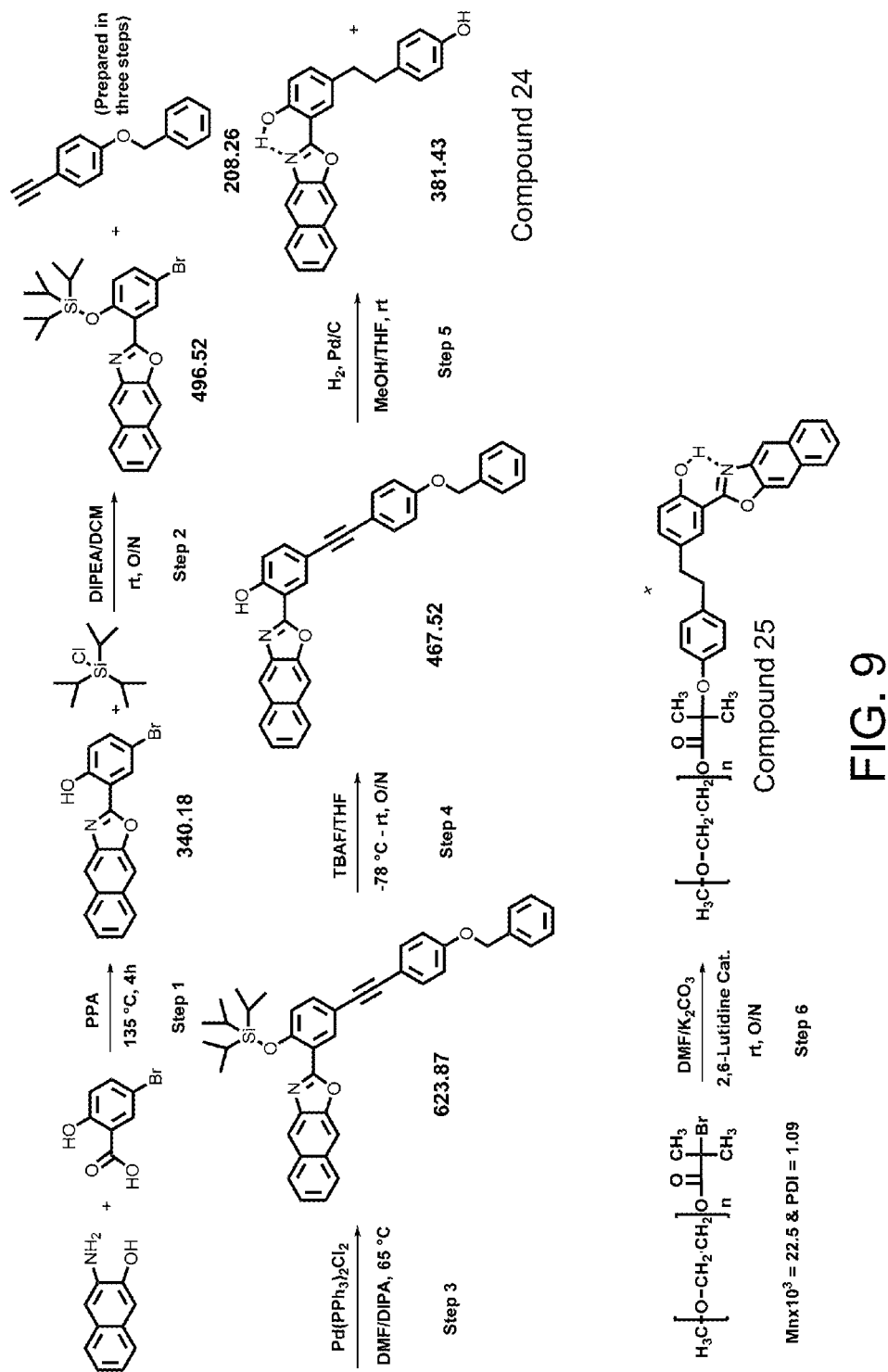
FIG. 9 shows a synthetic pathway of a $Li^+$ profluorophore and its covalent attachment to an electrolyte polymer according to an illustrative embodiment.

Compound 25 is a polymer (poly(ethylene oxide)) covalently bound to a Li+ profluorophore. The Li+ profluorophore comprises the 2-(naphtho[2,3-d]oxazol-2-yl)phenol moiety and a linking group derived from a linking group precursor (a 4-hydroxyphenyl)ethyl group). The number of monomer units (n) in the poly(ethylene oxide) polymer may vary, e.g., from about 100 to about 50,000. Compound 25 may be made by reacting compound 24 (a derivative of 2-(naphtho[2,3-d]oxazol-2-yl)phenol comprising an (4-hydroxyphenyl)ethyl group as a linking group precursor) with a poly(ethylene oxide) polymer comprising an alkyl halide functional group. An illustrative synthetic pathway for compounds 24 and 25 is shown in FIG. 9.

$LiPF_6$, $LiBF_4$, $LiClO_4$, etc. The electrolyte composition may comprise a solvent, e.g., ethylene carbonate, dimethyl carbonate, diethyl carbonate, acetonitrile, etc. The electrolyte composition may include other materials, e.g., fillers such as nanoparticles, including metal oxide nanoparticles.

A variety of active materials for the separator may be used, provided the materials are capable of conducting lithium ions while being electrically insulating. Suitable materials include polymers (i.e., separator polymers), e.g., polyolefins, such as polyethylene, polypropylene, poly(tetrafluoroethylene), polyvinyl chloride, etc. The form of the separator is generally that of a porous layer, film or membrane.

The Li+ profluorophores may be incorporated into Li+ batteries and components of Li+ batteries by freely dispersing the Li+ profluorophore into the Li+ battery or the material of a particular component of the Li+ battery (e.g., the electrolyte composition or the separator). By way of illustration, the Li+ profluorophore may be dispersed into the electrolyte composition by preparing a slurry or solution of the Li+ profluorophore with the other materials of the electrolyte composition and casting or spin-coating the slurry/solution onto a desired substrate or filling a sample cell with the slurry/solution.

Figure 10B:
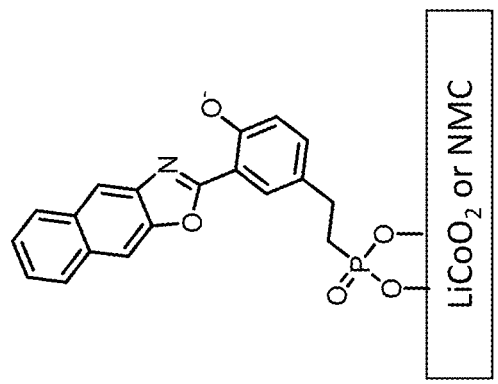
FIGS. 10A-10B show $Li^+$ profluorophores covalently bound to electrodes.
Figure 10A:
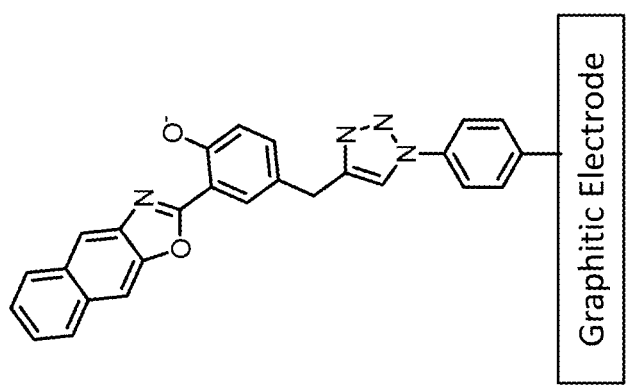

Alternatively, the Li+ profluorophores may be incorporated by covalently binding the Li+ profluorophore to the material of a component of the Li+ battery via one or more linking group precursors of the Li+ profluorophore. By way of illustration, the Li+ profluorophore may be covalently bound to a polymer of the electrolyte composition, a filler of the electrolyte composition or a polymer of the separator by reacting linking group precursors of the Li+ profluorophore with functional groups on the polymers or fillers. As described above, such functional groups may include azide groups, alkynyl groups, and metal oxide groups. By way of illustration, compounds 22 and 25 described above are each a Li+ profluorophore covalently bound to an electrolyte polymer (poly(ethylene oxide)). Another illustration is shown in FIGS. 10A-10B showing Li+ profluorophores covalently bound to electrodes. In FIG. 10A, compound 20 was reacted with a graphitic electrode which had been pretreated with diazonium-functionalized phenyl azide. In FIG. 10B, compound 24 was reacted with an electrode composed of $LiCoO_2$ or $LiNi_xMn_yCo_zO_2$ (NMC).

When incorporated into Li+ batteries or components of Li+ batteries, the Li+ profluorophores may be characterized as being substantially immobilized or embedded within the Li+ battery/component. By substantially immobilized or embedded, it is meant that the diffusion of the Li+ profluorophores within the Li+ battery/component is sufficiently slow compared to the timescale over which fluorescent images of the Li+ batteries/components are obtained. Li+ profluorophores freely dispersed in some gel electrolyte compositions, solid electrolyte compositions and battery separators may be considered to be substantially immobilized or embedded. Li+ profluorophores covalently bound to gel electrolyte compositions, solid electrolyte compositions and battery separators may also be considered to be substantially immobilized or embedded.

The dispersion of the Li+ profluorophore into the Li+ battery or component thereof or the functionalization of the Li+ battery component with the Li+ profluorophore may be such that the distribution of the Li+ profluorophore throughout the Li+ battery or component thereof is substantially uniform (i.e., homogeneous).

The Li+ batteries and components of Li+ batteries may be incorporated with various amounts of Li+ profluorophore. The amount may be that which provides a sufficient amount of fluorescence signal without significantly affecting the operation of the Li+ battery/component under typical working conditions. The amount may be in the range of μM, e.g., 1-1000 μM.

When incorporated into Li+ batteries or components of Li+ batteries, the Li+ battery or the components may include other additives, e.g., additives which may facilitate lithium ion binding and fluorescence of the Li+ profluorophore. By way of illustration, the Li+ battery or the components may include a base, e.g., triethylamine (TEA) to facilitate deprotonation and lithium ion binding of the Li+ profluorophore.

Li+ Imaging Methods

The Li+ profluorophores enable methods of imaging lithium ions in Li+ batteries and Li+ battery components. By contrast to conventional techniques of characterizing Li+ batteries and components thereof, the present imaging methods are capable of providing real-time spatial information (e.g., maps) of the distributions of lithium ions in Li+ batteries and components thereof, including Li+ batteries and components thereof which are operating under typical working conditions. At least some embodiments of the present imaging methods are capable of providing such maps with high temporal resolution (e.g., milliseconds) and spatial resolution (e.g., individual Li+ ions).

In one embodiment, the method comprises illuminating an area of a Li+ battery (or a component thereof) comprising Li+ profluorophores, in the presence of lithium ions with a wavelength of light selected to induce fluorescence of the lithium ion bound form of the Li+ profluorophore, and detecting the fluorescence. The area generally has a size and shape which depend upon the illumination technique used, as further described below. The selected wavelength of light may depend upon the particular Li+ profluorophore, i.e., the electronic absorption spectrum of the lithium ion bound form of the Li+ profluorophore. The selected wavelength of light may be that which maximizes the fluorescence of the lithium ion bound form of the Li+ profluorophore. The selected wavelength of light may also be that which minimizes fluorescence of the lithium ion unbound form of the Li+ profluorophore and/or other materials of the Li+ battery. When lithium ions bind to Li+ profluorophores which are within the illuminated area, the detected fluorescence indicates the presence and distribution of lithium ions within the area. Multiple areas may be illuminated and fluorescence detected at each area to provide an even larger multidimensional (e.g., 2D or 3D) image of the Li+ battery/component. The area(s) may be illuminated and fluorescence detected over a selected period of time to provide information about how the distribution of lithium ions within the area(s) changes over time. The area(s) may be illuminated as a function of a variety of conditions (e.g., temperature, electric potential, voltage cycling, etc.) to provide information about how the distribution and transport of lithium ions is affected by such conditions.

The methods may be carried out on a variety of optical microscopes, e.g., widefield microscopes and confocal microscopes. Widefield microscopy entails a relatively large area (e.g., approximately 1-1000 μm in diameter) being illuminated while spatial resolution may be provided by a sensitive two-dimensional multi-element detector, e.g., a camera. Time-resolution is generally limited by the frame rates of cameras, which may reach tens of milliseconds per frame or faster depending on the number of pixels used.

Confocal microscopy entails illumination of the smallest area possible, a diffraction-limited spot (e.g., approximately 170 nm in diameter for 405 nm excitation wavelength), followed by detection on a single-element detector, e.g., a photomultiplier, an avalanche photodiode (APD), etc. Further reduction in background signal and increases in spatial resolution may be achieved by using a pinhole to eliminate out-of-plane signal. The illumination area (e.g., a laser spot) may be raster scanned across the sample to create a larger image, with time resolution being highly dependent on the image size and signal strength. 3D sectioning is also possible with confocal microscopy.

In both widefield and confocal microscopy, conventional implementation has a resolution limited by optical diffraction, e.g., to approximately 170 nm. However, super-resolution techniques can be deployed to break this limit, reaching resolutions of 10 nm, e.g., STimulated Emission Depletion (STED) microscopy, the PhotoActivation Localization Microscopy (PALM) family of techniques, etc.

Another optical microscope which may be used is one configured for total internal reflection microscopy.

Figure 3:
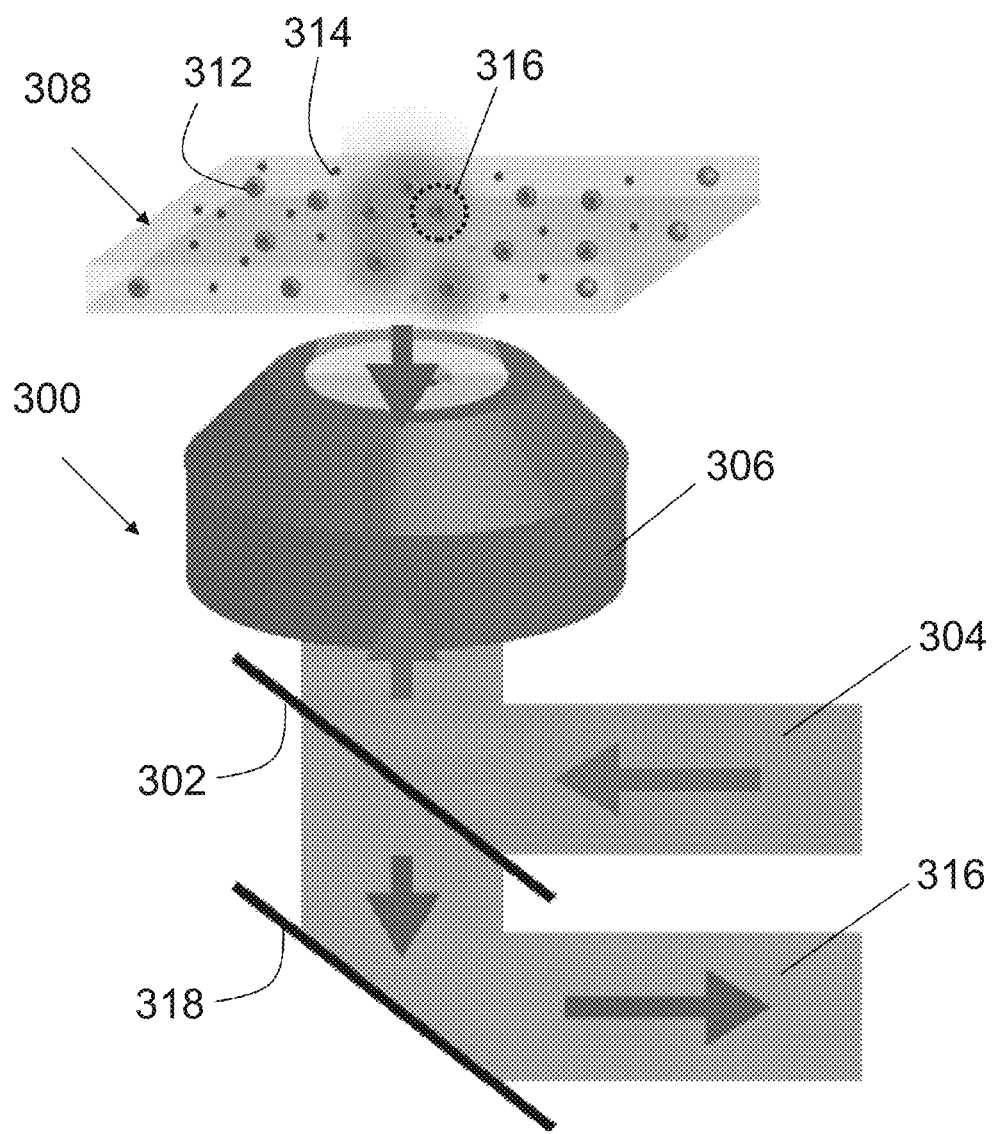
FIG. 3 depicts an apparatus for carrying out a method of imaging lithium ions in a component of a $Li^+$ battery using fluorescence microscopy according to an illustrative embodiment.

An illustrative apparatus 300 for carrying out the disclosed methods using widefield microscopy is shown schematically in FIG. 3. The apparatus 300 includes a dichroic mirror 302 to direct light 304 from a light source (not shown, e.g., a fiber-coupled laser producing 405 nm light) towards a microscope objective 306 (e.g., a high numerical microscope objective). The microscope objective 306 focuses the light 304 onto a $Li^+$ battery component 308 (e.g., a layer of an electrolyte composition) supported on the apparatus 300, thereby illuminating an area of the $Li^+$ battery component 308. The $Li^+$ battery component 308 comprises $Li^+$ profluorophores 312 embedded and dispersed throughout the layer of the electrolyte composition. Lithium ions 314 are also dispersed throughout the layer of the electrolyte composition. Any fluorescence 316 induced by the light 304 is collected by the microscope objective 306 and separated from the light 304 via the dichroic mirror 302. A dotted line indicates fluorescence 316 induced by the light 304 and the presence of lithium ions. The apparatus includes another mirror 318 to direct the fluorescence 316 to a detector (not shown, e.g., an electron-multiplying CCD camera). Other emission filters (not shown) may be used to block undesired wavelengths of light from reaching the detector.

The disclosed imaging methods will find use in the development of new $Li^+$ batteries and components thereof exhibiting desired properties (e.g., lithium ion conductivity); understanding the mechanisms which negatively affect $Li^+$ battery/component performance; in monitoring quality control during the manufacture of $Li^+$ batteries and components thereof; and in monitoring performance during the lifetime of $Li^+$ batteries and components thereof. At least some of these uses are further illustrated in the examples below. $Li^+$ batteries comprising a window (e.g., in the housing of the $Li^+$ battery) may be imaged using the methods described herein via the window.

EXAMPLES

Example 1: Synthesis of Compound 3

100 mg of 3-amino-2-naphthalenol, 95 mg of 2-hydroxybenzoic acid, and two scoops of polyphosphoric acid were combined and stirred at 100° C. for 2.5 hours. The crude reaction mixture was dissolved in ethyl acetate and washed several times with water and dried with sodium sulfate. The crude material was then purified via silica chromatography with a 3:7 ethyl acetate:hexanes eluent. The optical properties of compound 3 are shown in FIGS. 1A-1B. FIG. 1A shows the electronic absorption spectrum of compound 3 in the deprotonated, lithium ion unbound state of the molecule (dashed) and the lithium ion bound state of the molecule (solid). FIG. 1B shows the fluorescence spectrum of compound 3 in the deprotonated, lithium ion unbound state of the molecule (dashed) and the lithium ion bound state of the molecule (solid). The conditions for the UV-visible absorption spectrum were 0.5 mM of compound 3 in triethylamine (TEA) and if present, 17 mM LiCl. The conditions for the fluorescence spectrum were 0.01 mM of compound 3, 0.57 mM TEA and if present, 30 mM LiCl. Fluorescence was pumped using 388 nm.

Example 2: Synthesis of Compound 5

100 mg of 3-aminonaphthalene-2-ol, 130 mg of 3-hydroxy-2-naphthoic acid, and two scoops of polyphosphoric acid were combined and stirred at 100° C. for 4 hours. The crude reaction mixture was dissolved in ethyl acetate and washed several times with water and dried with sodium sulfate. The crude material was then purified via silica chromatography with a 1:9 ethyl acetate:hexanes eluent.

Example 3: Synthesis of Compound 16

4-bromo-2-(naphtha[2,3-d]oxazol-2-yl)phenol was first synthesized by reacting 50 mg of 3-aminonaphthalene-2-ol, 75 mg of 5-bromo-2-hydroxybenzoic acid, and 45 mg of 2,4-Bis(4-methoxyphenyl)-1,3,2,4-dithiadiphosphetane-2,4-disulfide in a microwave reaction at 140° C. for four minutes.

150 mg of 4-bromo-2-(naphtha[2,3-d]oxazol-2-yl)phenol, 30 mg of $Pd(PPh_3)_2Cl_2$ and 17 mg of CuI were then combined and placed under Argon. 10 mL of diisopropylamine and 74 mg of 2-methylbut-3-yn-2-ol were added to the flask. The flask was heated at 80° C. for 28 h. The reaction was quenched in sat. $NH_4Cl$ solution, extracted with ethyl acetate, washed with brine (50 mL), dried over anhydrous sodium sulfate, and concentrated under reduced pressure. This residue was purified by silica column chromatography using 2:8 ethyl acetate:hexane, yielding 4-(3-hydroxy-3-methylbut-1-yn-1-yl)-2-(naphtho[2,3-d]oxazol-2-yl)phenol.

65 mg of 4-(3-hydroxy-3-methylbut-1-yn-1-yl)-2-(naphtho[2,3-d]oxazol-2-yl)phenol was dissolved in 1,4-dioxane. 25 mg of KOH was added. The mixture was refluxed for 4 h. The solvent removed under reduced pressure. The residue was diluted with water and acidified with 6N HCl and extracted with ether. The ether extract was dried over anhydrous sodium sulfate, concentrated, and purified by preparative TLC using 2:8 ethylacetate:hexanes as eluent to yield 4-ethynyl-2-(naphtho[2,3-d]oxazol-2-yl)phenol.

Example 4: Imaging Lithium Ions an Electrolyte Composition

Figure 4:
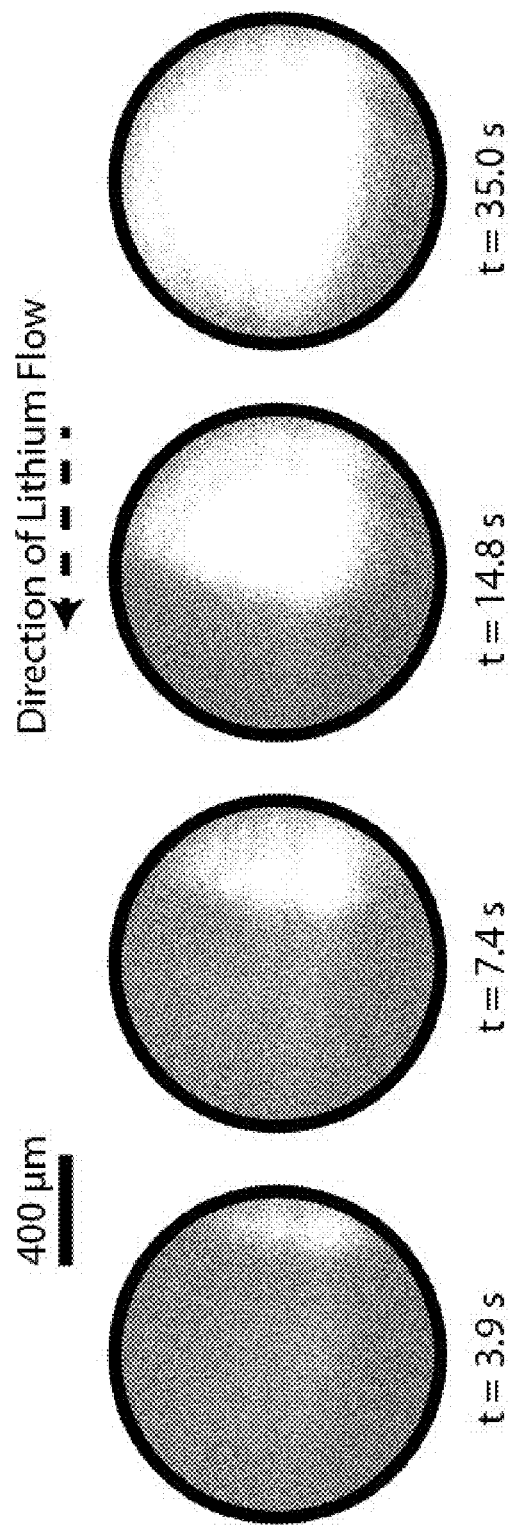
FIG. 4 shows fluorescence images of lithium ions diffusing through an electrolyte composition comprising the $Li^+$ profluorophore of FIGS. 1A-1B over a period of time according to an illustrative embodiment.

An electrolyte composition was formed by mixing propylene carbonate, polyethylene oxide, triethylamine (4% by volume), and the $Li^+$ profluorophore compound 3 ($2.3 \times 10^{-5}$ M). The electrolyte composition was added to a microwell mounted on an inverted microscope using a widefield lens. A 405 nm laser beam was used to illuminate the electrolyte composition at a power of 1.00 mW. A 2× (numerical aperture 0.06) was used to collect fluorescence. A saturated solution of lithium chloride in propylene carbonate was injected into the electrolyte composition and a series of images were obtained over a period of time. Illustrative images are shown in FIG. 4 in which the expanding bright feature denotes a region of locally high lithium ion concentration as lithium ions diffuse through the electrolyte composition.

Example 5: Imaging Lithium Ions in Electrolyte Compositions

Electrolyte compositions, including solid electrolyte compositions and gel electrolyte compositions are imaged using the disclosed methods to investigate lithium ion transport through the electrolyte compositions.

Solid Electrolyte Composition.

A slurry of a polymer (e.g., polyethylene oxide), salt (e.g., lithium salt, sodium and tetrabutylammonium chlorides and perchlorates, or combinations thereof), $Li^+$ profluorophore and a solvent (e.g., acetonitrile) is prepared and cast onto a transparent glass substrate to form a thin film of the solid electrolyte composition. See Croce, F., et al., "Physical and chemical properties of nanocomposite polymer electrolytes." *J. Phys. Chem. B,* 103:10632-10638, 1999.

Figure 5:
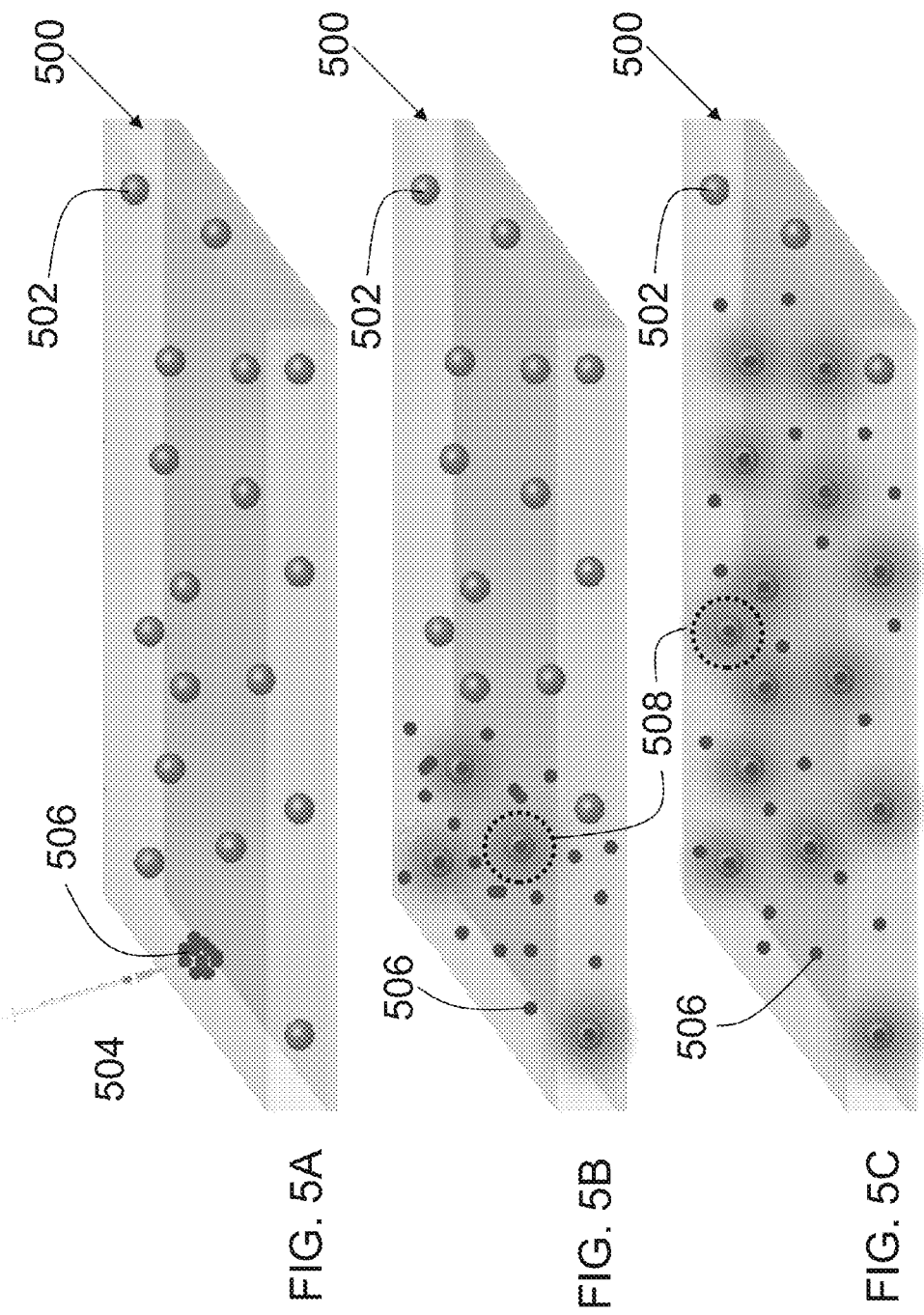
FIGS. 5A-5C provide a schematic illustration of imaging lithium ions in an electrolyte composition according to an illustrative embodiment.

As illustrated in FIG. 5A, a supported polymer electrolyte film 500 comprising a polymer, salt, $Li^+$ profluorophores 502 and a solvent, is mounted on an apparatus similar to that shown in FIG. 3. A solid or liquid solution 504 of lithium salt (e.g., LiCl) in the polymer is injected at a known position in the film 500. As illustrated in FIGS. 5B and 5C, fluorescence imaging using the disclosed methods tracks the flow of lithium ions 506 away from the injection site. As the lithium ions 506 diffuse through the film 500, they may displace a counter ion bound to the $Li^+$ profluorophores 502 to yield the highly fluorescent lithium ion bound form of the molecule (indicated by halos 508 surrounding some $Li^+$ profluorophores 502). Dotted lines are used to mark some halos 508. Shifts in the spatial distribution of fluorescence indicate the shifting distribution of lithium ions 506. Regions that are opaque to lithium ion transport are conspicuous as gaps/dark regions in the fluorescence image. Such gaps are indicative of regions of high crystallinity that prohibit lithium ion transport. The location of the $Li^+$ profluorophores 502 is independently determined by optically pumping the lithium-unbound form of the $Li^+$ profluorophore to reveal regions of lower $Li^+$ profluorophore density to avoid confusion.

The fluorescence imaging illustrated in FIGS. 5A-5C is repeated using different materials (e.g., different polymers) and/or additional materials (e.g., nanoparticle additives) in the electrolyte composition and using electrolyte compositions which have been prepared/deposited under different conditions to investigate how the spatial distribution of lithium ion flow is affected.

Gel Electrolyte Composition.

A gel electrolyte composition comprising a polymer (e.g., polyethylene oxide) and a solvent (e.g., acetonitrile) is prepared, cast on a transparent substrate and analyzed as described above.

In some experiments, electrolyte compositions are placed in a sample cell which includes electrodes (e.g., non-intercalating, platinum electrodes) at opposite sides of the intervening electrolyte composition. A biasing potential is applied to increase lithium ion flow in the electrolyte composition. The effect of repeated cycling on lithium ion transport is investigated.

Example 6: Imaging Lithium Ions in a Lithium Ion Battery Separator

Lithium ion battery separators are imaged using the disclosed methods to investigate lithium ion transport through the separators.

Figure 6:
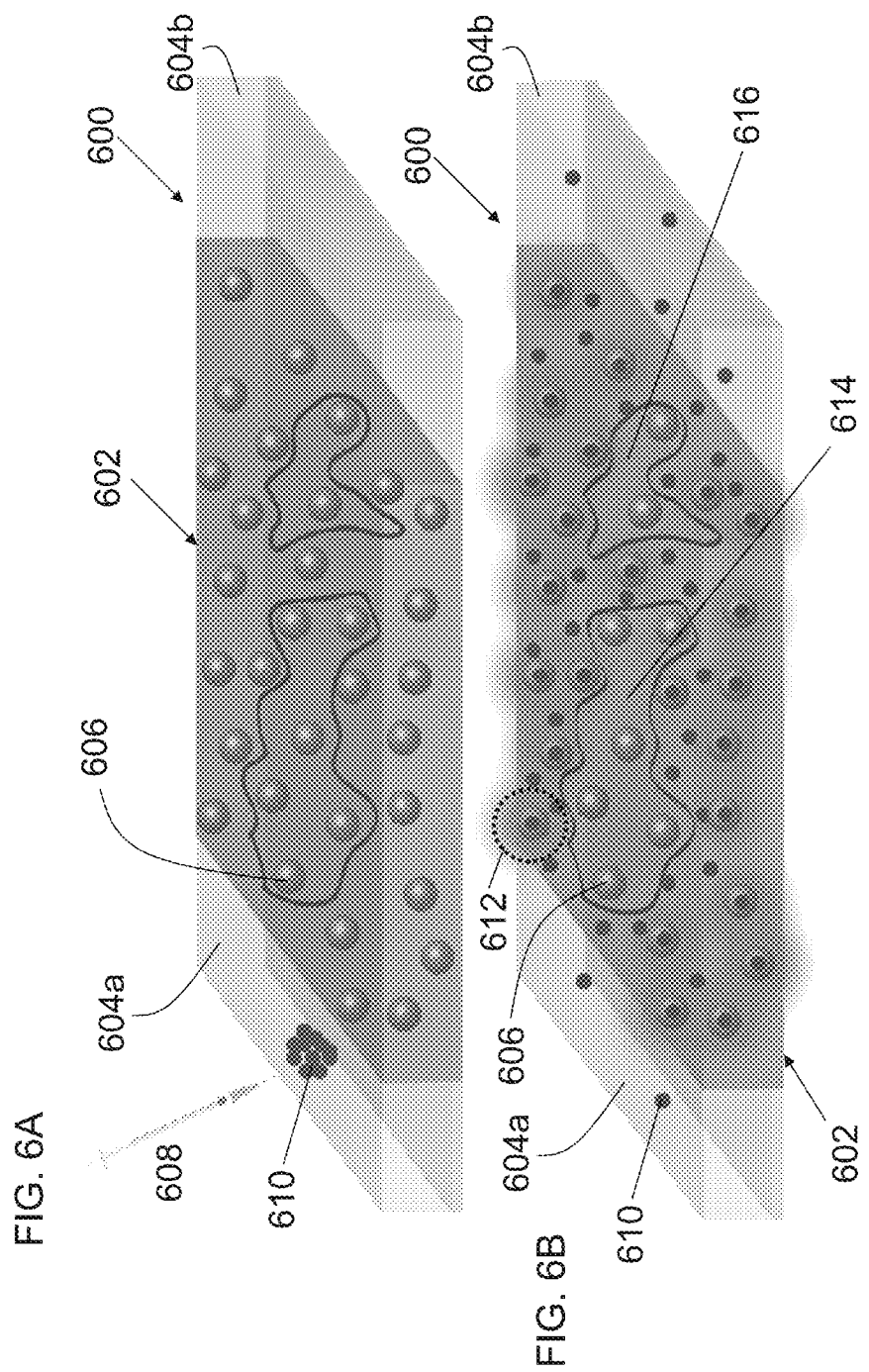
FIGS. 6A-6B provide a schematic illustration of imaging lithium ions in a lithium ion battery separator according to an illustrative embodiment.

As illustrated in FIGS. 6A-6B, a sample cell 600 comprising a separator 602 between a first region 604a and a second region 604b of liquid electrolyte composition is fabricated. The separator 602 is prepared by spin-coating a solution of a polymer (e.g., a polyolefin) and $Li^+$ profluorophores 606 onto a transparent substrate of the sample cell 600. Electrodes (not shown) may be installed at opposite sides of the sample cell 600. As illustrated in FIG. 6A, a liquid solution 608 of lithium ions 610 is injected into the first region 604a. The lithium ions 610 diffuse through the separator 602 (either via free diffusion or the application of an electrical potential). As illustrated in FIG. 6B, fluorescence imaging using the disclosed methods tracks the flow of lithium ions 610 away from the injection site. As the lithium ions 610 diffuse through the separator 602, they may bind to the $Li^+$ profluorophores 606 to yield the highly fluorescent lithium ion bound form of the molecule (indicated by halos 612 surrounding some $Li^+$ profluorophores 606). Dotted lines are used to mark some halos 612. However, regions of the separator 602 that are opaque to lithium ion transport (indicated by the lines) are visible as dark regions in the fluorescence images. The tortuosity, a reflection of the circuitousness of the pathway taken by the lithium ions through the separator 602, is investigated by observing the chronology of how different spatial regions of fluorescence "turn on" as a function of time, establishing the connectivity between different spatial domains 614, 616. Lithium ions 610 are repeatedly cycled back and forth through the separator 602 to investigate how lithium ion transport networks change in time.

In another experiment, commercially available separators are bonded to a transparent substrate of a sample cell similar to that shown in FIGS. 6A-6B. A solution of $Li^+$ profluorophores is prepared and allowed to diffuse into the separator. The separator is analyzed as described above.

The fluorescence imaging as illustrated in FIGS. 6A-6B is repeated using different materials (e.g., different polymers), using separators which have been prepared/deposited under different conditions, and as a function of temperature to investigate how the spatial distribution of lithium ion flow is affected.

Example 7: Imaging Lithium Ions in a Working Lithium Ion Battery

Lithium ion batteries are imaged using the disclosed methods to investigate lithium ion transport through the batteries.

Figure 7:
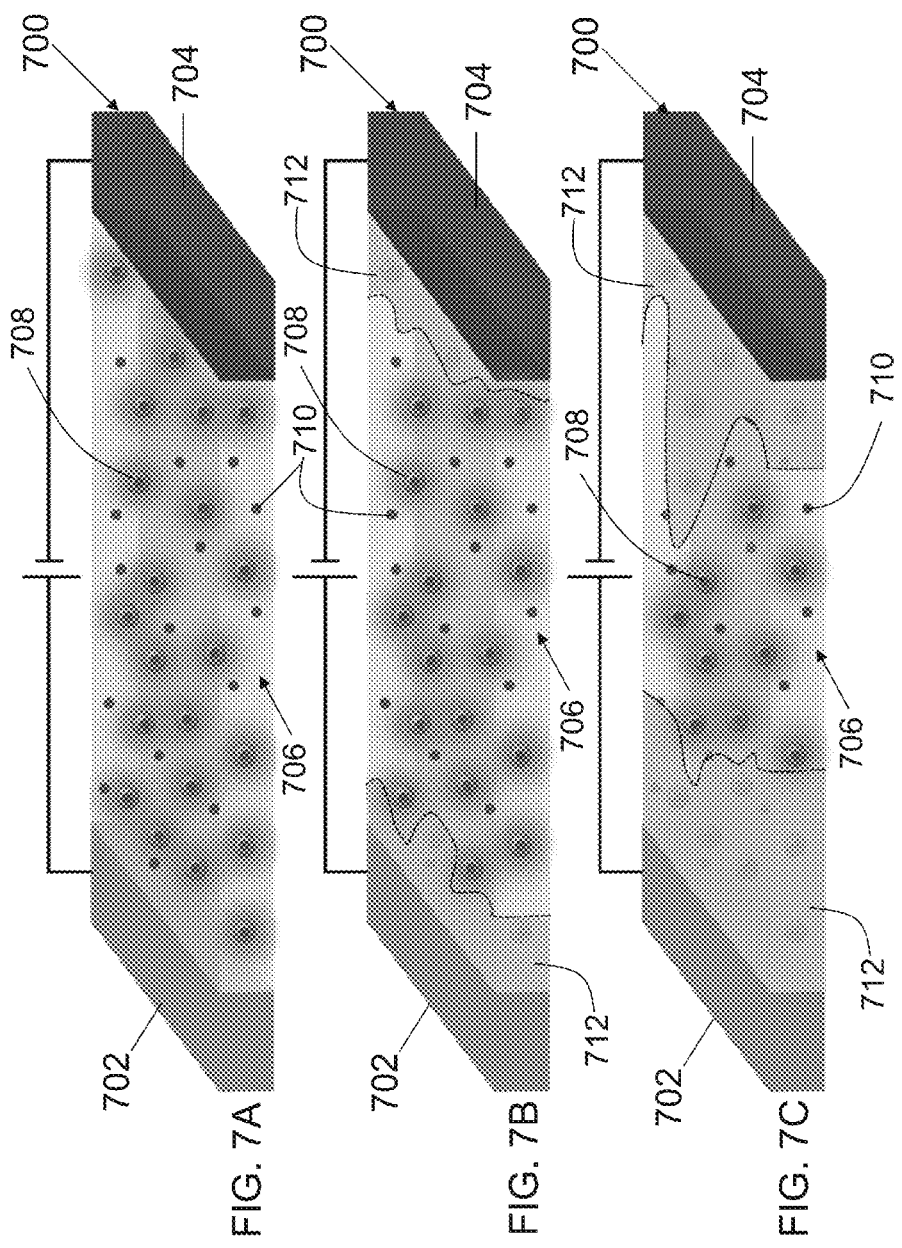
FIGS. 7A-7C provide a schematic illustration of imaging lithium ions in a lithium ion battery according to an illustrative embodiment.

As illustrated in FIGS. 7A-7C, a sample cell 700 is fabricated comprising an anode 702 (e.g., graphite) and a cathode 704 (e.g., lithium cobalt oxide) on opposite sides of a layer of a solid or gel electrolyte composition 706, which is prepared as described in Example 5 above and deposited on a transparent substrate of the sample cell 700. The electrolyte composition 706 comprises $Li^+$ fluorophores 708 and lithium ions 710. As illustrated in FIG. 7A, fluorescence imaging using the disclosed methods provides maps of the spatial distribution of lithium ions 710. However, as illustrated in FIGS. 7B and 7C, as the potential of the sample cell 700 is cycled, a solid electrolyte interface/interphase (SEI) 712 forms (also indicated by lines) as materials of the electrolyte composition 706 decompose at the interface with the electrodes 702, 704. As more cycles are applied, the SEI layer 712 grows and increasingly penetrates into the electrolyte composition 706. As it does, $Li^+$ fluorophores 708 are incorporated into the SEI layer 712, decompose and no longer fluoresce. Consequently, the growth of the SEI layer 712 is visible as darkening regions in the fluorescence images. The growth of the SEI layer 712 is monitored as a function of time, electric potential, etc.

Example 8: Imaging Single Lithium Ions

Individual lithium ions are imaged using the disclosed methods to investigate individual lithium ion transport through $Li^+$ batteries and components thereof.

A gel or solid electrolyte composition is prepared as described in Example 5 above or a separator is prepared as described in Example 6 above. The electrolyte composition/separator is provided in a sample cell which is configured to confine the embedded Li+ profluorophores to a depth of about 100-200 nm. The sample cell may otherwise be as described in Examples 6-8 above. The sample cell is mounted on a total internal reflectance microscope, which minimizes background while allowing for two-dimensional imaging. A highly dilute (e.g., ~pM) solution of lithium ions is injected into the electrolyte composition/separator and fluorescence images are obtained as a function of time.

Figure 8:
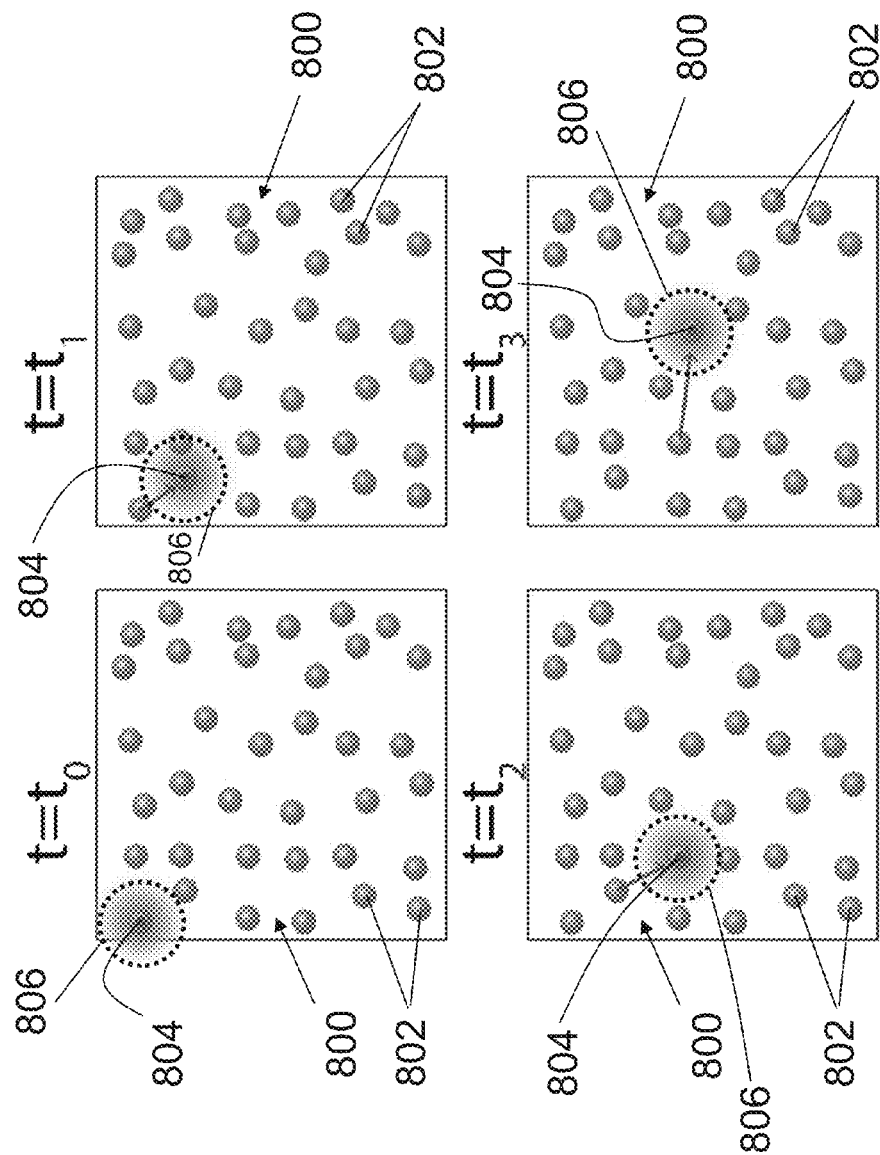
FIG. 8 is a schematic illustration of imaging a single lithium ion in a component of a $Li^+$ battery.

Four such images of an electrolyte composition/separator 800 comprising embedded Li+ profluorophores 802 are illustrated schematically in FIG. 8. While a lithium ion 804 is between Li+ profluorophores 802, it is not fluorescent and is invisible in the images. Once the lithium ion 804 is bound to the Li+ profluorophore 802, the complex becomes highly fluorescent as illustrated by the halo 806. Dotted lines are used to mark some halos 806. As the lithium ion 804 moves between stationary Li+ profluorophores 802, the fluorescence appears to shift in the image, allowing tracking of the single lithium ion 804. The interconversion between the unbound and bound forms of the lithium ion is expected to be longer than the frame rate of the imaging camera (several tens of milliseconds). Super-localization techniques are applied, whereby the position of a single emitter can be localized to a precision substantially lower than the diffraction limit, enabling the tracking of lithium ion positions to a resolution of at least tens of nm. Lithium ion tracking data is used to extract diffusion constants of individual lithium ions as well as spatial variations in the diffusion constant across the electrolyte composition/separator 800. Lithium ion tracking data is obtained as a function of various conditions as described above in Examples 6-8.

Example 9: Synthesis of Compounds 24 and 25

The synthetic pathway shown in FIG. 9 was used to synthesize compounds 24 and 25.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A lithium ion indicator material for a lithium ion battery comprising a lithium ion battery material and a Li+ profluorophore dispersed within or on the lithium ion battery material, wherein the Li+ profluorophore is a compound of Formula 1, the protonated version of Formula 1, or a salt of Formula 1

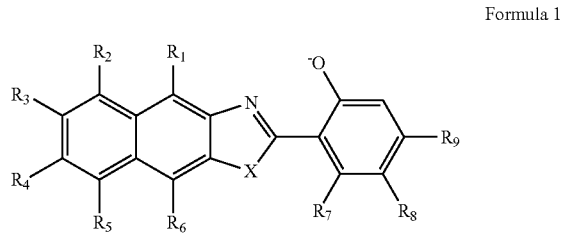

Formula 1 wherein X is O or S and $R_{1-9}$ are independently selected from hydrogen, a conjugation extending group, an electron withdrawing group, an electron donating group, and a linking group derived from a linking group precursor.

2. The material of claim 1, wherein the Li+ profluorophore is covalently bound to the lithium ion battery material.

3. The material of claim 1, wherein the lithium ion battery material is an electrolyte composition, a separator active material, an electrode active material or combinations thereof.

4. The material of claim 2, wherein the lithium ion battery material is an electrolyte polymer.

5. The material of claim 4, wherein the electrolyte polymer is selected from a lithium coordinating polymer, poly(ethylene oxide), propylene carbonate, and combinations thereof.

6. The material of claim 2, wherein the lithium ion battery material is a separator polymer.

7. The material of claim 6, wherein the separator polymer is selected from polyethylene, polypropylene, poly(tetrafluoroethylene), polyvinyl chloride, and combinations thereof.

8. The material of claim 2, wherein the lithium ion battery material is an electrode active material.

9. The material of claim 8, wherein the electrode active material is graphite or a lithium containing metal oxide.

10. The material of claim 1, wherein the conjugation extending group is selected from an alkenyl group, a first alkynyl group, and an aryl group; the electron withdrawing group is selected from a cyano group, a nitro group, a ketone group, an ester group, an aldehyde group, a halogen atom, and an alkyl group; the electron donating group is selected from an amine group, an ether group and a thioether group; and the linking group is derived from a linking group precursor comprising a second alkynyl group, an azide group, a phosphonate group, or a silane group.

11. The material of claim 1,
wherein X is O or S; and
either one substituent group from $R_{1-9}$ is selected from the conjugation extending group, the electron withdrawing group, the electron donating group, and the linking group derived from the linking group precursor and the remaining substituent groups are hydrogen;
or two adjacent substituent groups from $R_{1-9}$ join to form an aromatic ring and the remaining substituent groups are hydrogen.

12. The material of claim 1,
wherein X is O or S; and
either one substituent group from $R_1$, $R_2$, $R_7$ and $R_8$ is selected from the electron withdrawing group and the remaining substituent groups are hydrogen;

or one substituent group from $R_{3-9}$ is selected from the conjugation extending group and the remaining substituent groups are hydrogen;

or one substituent group from $R_1$ and $R_2$ is selected from the electron donating group and the remaining substituent groups are hydrogen;

or $R_8$ is the linking group derived from the linking group precursor and the remaining substituent groups are hydrogen;

or two adjacent substituent groups from $R_3$, $R_4$, $R_7$, $R_8$ and $R_9$ join to form an aromatic ring and the remaining substituent groups are hydrogen.

13. The material of claim 1, wherein X is O or S; and either one substituent group from $R_{1-9}$ is selected from a halogen atom, an unsubstituted or substituted alkyl group, a cyano group, an alkynyl group, an ether group and the linking group derived from the linking group precursor, and the remaining substituent groups are hydrogen;

or two adjacent substituent groups from $R_{1-9}$ join to form an aromatic ring and the remaining substituent groups are hydrogen.

14. The material of claim 1, wherein X is O or S; and either one substituent group from $R_1$, $R_2$, $R_7$ and $R_8$ is selected from a halogen atom, an unsubstituted or substituted alkyl group and a cyano group, and the remaining substituent groups are hydrogen;

or one substituent group from $R_{3-9}$ is an alkynyl group and the remaining substituent groups are hydrogen;

or one substituent group from $R_1$ and $R_2$ is selected from an ether group and the remaining substituent groups are hydrogen;

or $R_8$ is the linking group derived from the linking group precursor and the remaining substituent groups are hydrogen;

or two adjacent substituent groups from $R_3$, $R_4$, $R_7$, $R_8$ and $R_9$ join to form an aromatic ring and the remaining substituent groups are hydrogen.

15. The material of claim 1, wherein the $Li^+$ profluorophore is covalently bound to the lithium ion battery material, wherein the lithium ion battery material is an electrolyte polymer, a separator polymer, an electrode active material or combinations thereof, and further wherein X is O or S, and at least one substituent from $R_{1-9}$ is the linking group derived from the linking group precursor, and the remaining substituents are selected from hydrogen, the conjugation extending group, the electron withdrawing group, and the electron donating group, further wherein the $Li^+$ profluorophore is covalently bound to the lithium ion battery material via the at least one linking group derived from the linking group precursor.

16. The material of claim 15, wherein the linking group precursor comprises an alkynyl group, an azide group, a phosphonate group, or a silane group.

17. The material of claim 15, wherein the remaining substituents are hydrogen.

18. The material of claim 15, wherein the lithium ion battery material is the electrolyte polymer or the separator polymer.

19. A lithium ion battery comprising an anode electrode;

a cathode electrode;

an electrolyte composition between the anode and the cathode; and optionally, a separator between the anode electrode and the cathode electrode, the electrolyte composition diffused throughout the separator, wherein the anode electrode, the cathode electrode, the electrolyte composition, the separator, or combinations thereof, comprise the material of claim 1.

* * * * *